United States Patent
Lee et al.

(10) Patent No.: US 8,315,431 B2
(45) Date of Patent: Nov. 20, 2012

(54) SYSTEM AND METHOD FOR MONITORING MOTION OBJECT

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 706 days.

(21) Appl. No.: 12/507,092

(22) Filed: Jul. 22, 2009

(65) Prior Publication Data
US 2010/0246885 A1    Sep. 30, 2010

(30) Foreign Application Priority Data

Mar. 30, 2009    (CN) .......................... 2009 1 0301202

(51) Int. Cl.
*G06K 9/00*    (2006.01)

(52) U.S. Cl. .......................... 382/103; 382/107; 382/118

(58) Field of Classification Search ................... 382/100, 382/103, 104, 107, 115, 118
See application file for complete search history.

(56) References Cited

U.S. PATENT DOCUMENTS

| | | | |
|---|---|---|---|
| 5,465,308 A * | 11/1995 | Hutcheson et al. | 382/159 |
| 5,745,668 A * | 4/1998 | Poggio et al. | 345/475 |
| 6,426,708 B1 * | 7/2002 | Trajkovic et al. | 340/932.2 |
| 6,445,409 B1 * | 9/2002 | Ito et al. | 348/155 |
| 6,807,286 B1 * | 10/2004 | Krumm et al. | 382/103 |
| 7,139,411 B2 * | 11/2006 | Fujimura et al. | 382/103 |
| 7,689,097 B2 * | 3/2010 | Kim et al. | 386/241 |
| 8,077,930 B2 * | 12/2011 | Hauke | 382/115 |
| 2006/0215903 A1 * | 9/2006 | Nishiyama | 382/154 |
| 2007/0154067 A1 * | 7/2007 | Laumeyer et al. | 382/103 |

FOREIGN PATENT DOCUMENTS
WO    0152545 A1    7/2001

* cited by examiner

*Primary Examiner* — Brian P Werner
*Assistant Examiner* — Shefali Goradia
(74) *Attorney, Agent, or Firm* — Altis Law Group, Inc.

(57) ABSTRACT

A motion object monitoring system captures images of monitored objects in a monitored area, and gives numbers to the monitored objects according to specific features of the monitored objects. The specific features of the monitored objects are obtained by detecting the captured images. Only one of the numbers of each of the monitored objects is stored, instead of repeatedly storing the numbers of same motion objects. The motion object monitoring system analyzes the stored numbers, and displays an analysis result. The motion object monitoring system also determines a movement of each of the motion objects according to corresponding numbers of the motion objects.

16 Claims, 5 Drawing Sheets

SYSTEM AND METHOD FOR MONITORING MOTION OBJECT

BACKGROUND

1. Technical Field

The present disclosure relates to monitoring systems and methods, and more particularly to a system and a method for monitoring motion objects.

2. Description of Related Art

Nowadays, video monitoring technology is prevalent in public spaces, such as banks, stores, and parking lots. Motion objects may be detected during video monitoring, and recorded data may be obtained for analysis. For example, video monitoring technology has been proposed to measure traffic flow on highways by recording a number of vehicles passing through monitored areas of the highways. In addition, video monitoring technology is helpful to compile consumer demographics in shopping malls and amusement parks by detecting and counting consumers who step into a monitored area in a predetermined time period. However, there are times that users may not want to repeatedly record or count a same motion object which appears in a monitored area many times in a time period.

DETAILED DESCRIPTION

Figure 1:
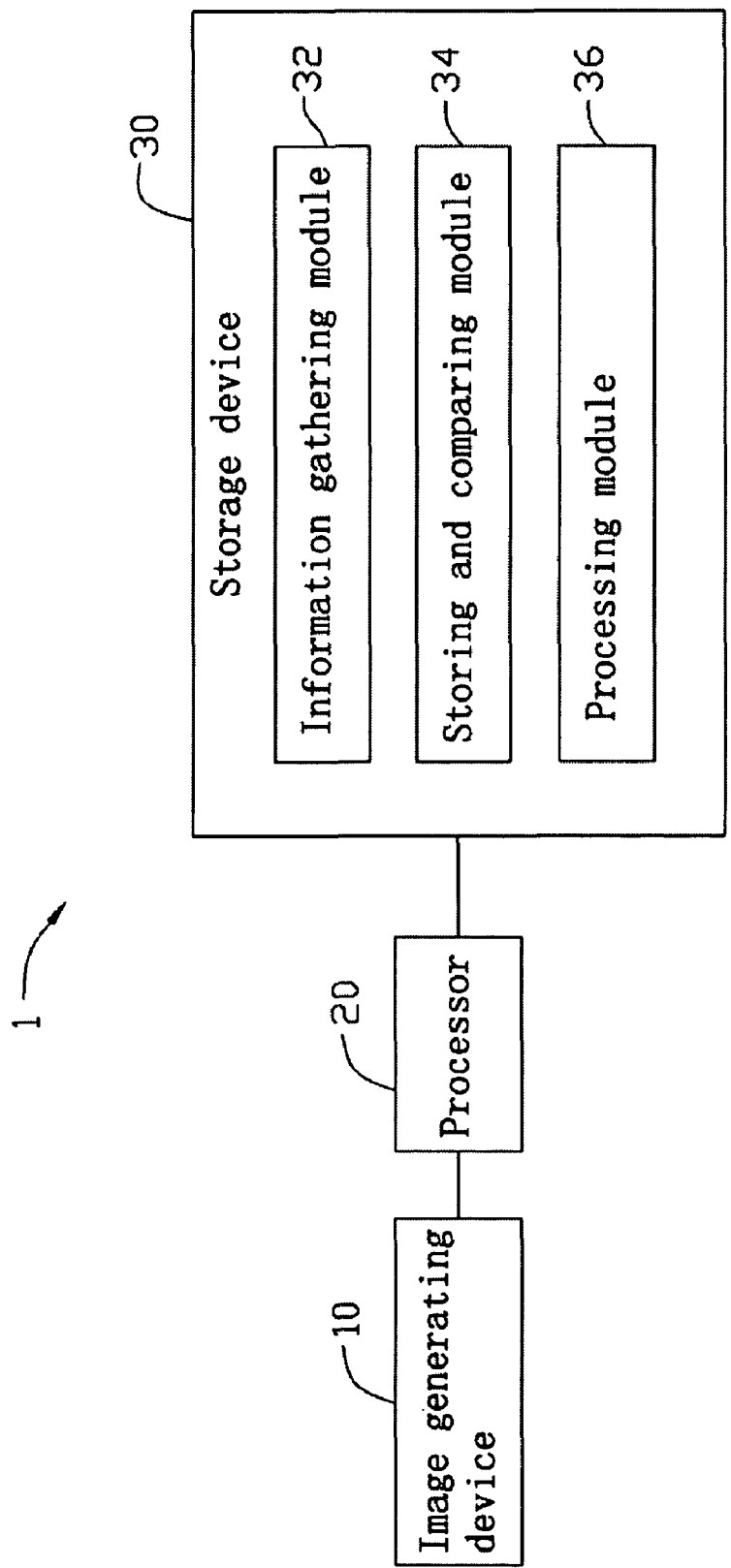
FIG. 1 is a block diagram of an embodiment of a motion object monitoring system, the motion object monitoring system includes an image generating device, and a storage device.

Referring to FIG. 1, an embodiment of a motion object monitoring system 1 includes an image generating device 10, a processor 20, and a storage device 30. The storage device 30 includes an information gathering module 32, a storing and comparing module 34, and a processing module 36. The information gathering module 32, the storing and comparing module 34, and the processing module 36 may include one or more computerized instructions and are executed by the processor 20. The motion object monitoring system 1 is operable to detect monitored objects in a monitored area, give numbers about the monitored objects, and analyze the given numbers of the monitored objects. In this embodiment, the monitored objects are pedestrians. In other embodiments, the monitored objects may be vehicles or other motion objects.

Figure 2:
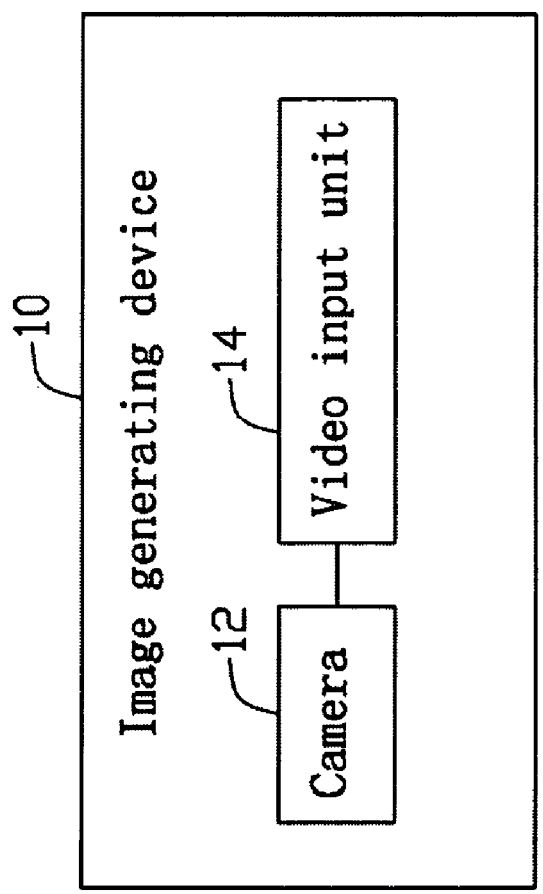
FIG. 2 is a block diagram of the image generating device of FIG. 1.
Figure 3:
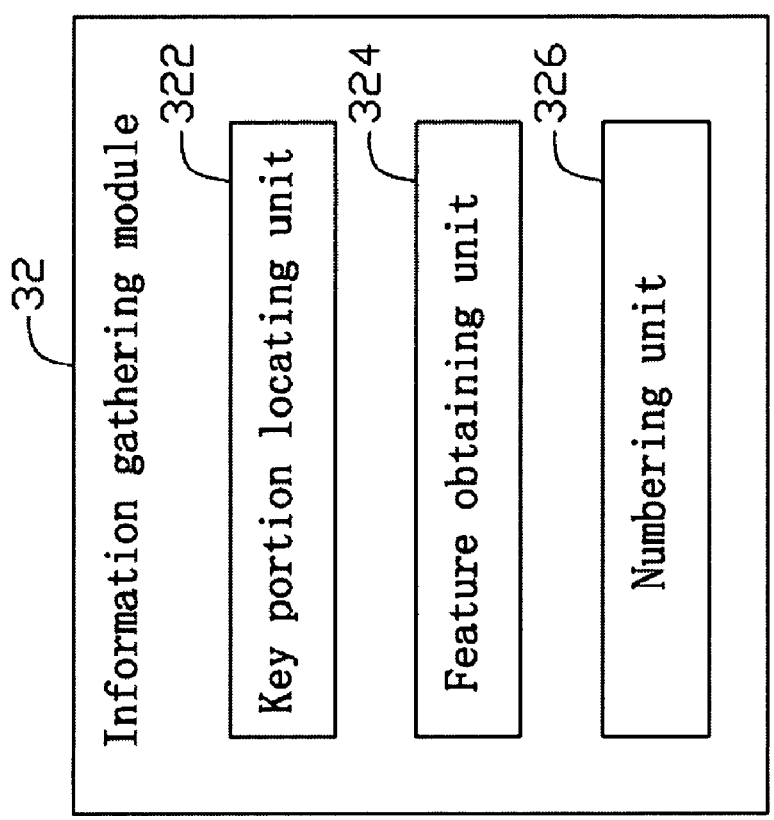
FIG. 3 is a block diagram of an information gathering module of the storage device of FIG. 1.
Figure 4:
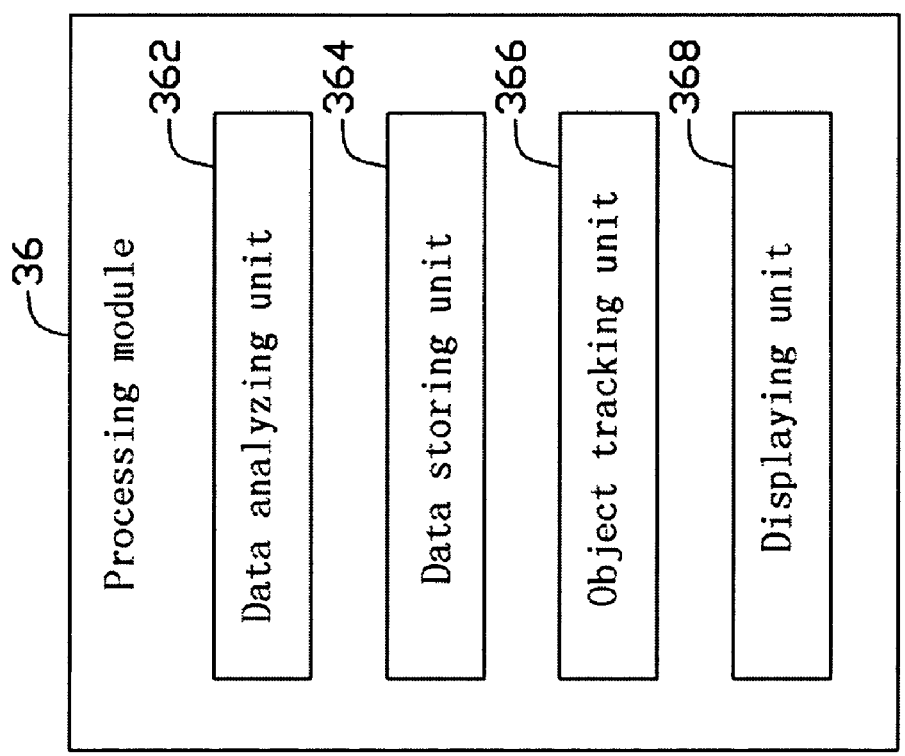
FIG. 4 is a block diagram of a processing module of the storage device of FIG. 1.

Referring to FIGS. 2 to 4, the image generating device 10 includes an image capturing device, such as a camera 12, and a video input unit 14. The information gathering module 32 includes a key portion locating unit 322, a feature obtaining unit 324, and a numbering unit 326. The processing module 36 includes a data analyzing unit 362, a data storing unit 364, an object tracking unit 366, and a displaying unit 368.

The camera 12 captures images of pedestrians in the monitored area. The video input unit 14 transmits the captured images to the information gathering module 32. The key portion locating unit 322 of the information gathering module 32 locates key portions of each of the captured images by detecting the captured images. The key portions of the captured images may have specific features of the monitored objects, such as license plates of vehicles, or facial features of humans. In this embodiment, the key portions of each of the captured images may include faces of the pedestrians. The feature obtaining unit 324 obtains facial features of each of the pedestrians by detecting faces of the pedestrians in the captured images. The facial features may include face shapes, complexions, and features of individual sense organs, such as features of ears, eyes, lips, and noses of the pedestrians. The numbering unit 326 gives a number to each of the pedestrians according to the facial features of the pedestrians. Each of the numbers may include a feature portion representing individual facial features of a pedestrian, a position portion representing a coordinate position of the pedestrian in the monitored area, and a time portion representing a time when the pedestrian appears at the coordinate position. Therefore, a plurality of numbers may be given to a same pedestrian when the pedestrian appears at different coordinate positions, or different times in the monitored area in a time period. The feature portions of the numbers of a same pedestrian are the same.

The given numbers of the pedestrians are received by the storing and comparing module 34. When a new number is received by the storing and comparing module 34, the feature portion of the new number is compared with the feature portions of the stored numbers in the storing and comparing module 34. The storing and comparing module 34 stores the new number when the feature portion of the new number is different from the feature portion of each of the stored numbers. The new number is not stored by the storing and comparing module 34 when the feature portion of the new number is the same to a feature portion of a stored number. Therefore, only one of given numbers of a same pedestrian appears in the monitored area in the time period can be stored by the storing and comparing module 34.

The time period can be predetermined according to the need, such as 10 minutes, 5 hours, or others. The stored numbers are transmitted to the data analyzing unit 362 for analysis. For example, the stored numbers may be counted by the data analyzing unit 362 to obtain the number of customers which enter into a supermarket from 9:00 am. to 5:00 pm. of a day. Each of the customers cannot be repeatedly counted. An analysis result of the stored numbers may be transmitted to the displaying unit 368 from the data analyzing unit 362. The displaying unit 368 displays the analysis result.

The position portion of the given number of each of the pedestrians is formed in coordinate information, representing the coordinate position of each of the pedestrian in the monitored area. All of the given numbers are transmitted to the data storing unit 364 by the numbering unit 326. The data storing unit 364 stores the given numbers of the pedestrians. Each of the pedestrians can be tracked by the object tracking unit 366. The object tracking unit 366 may read the position portions and the time portions of given numbers which include same feature portions, from the data storing unit 364, and sequence the position portions of the given numbers of each of the pedestrians according to the time portions. The position portions of each of the pedestrians are displayed on the displaying unit 368. Therefore, the displaying unit 368 can display the coordinate positions of a pedestrian in sequence of times. Thus, the movement of a pedestrian can be surveyed from the displaying unit 368.

Figure 5:
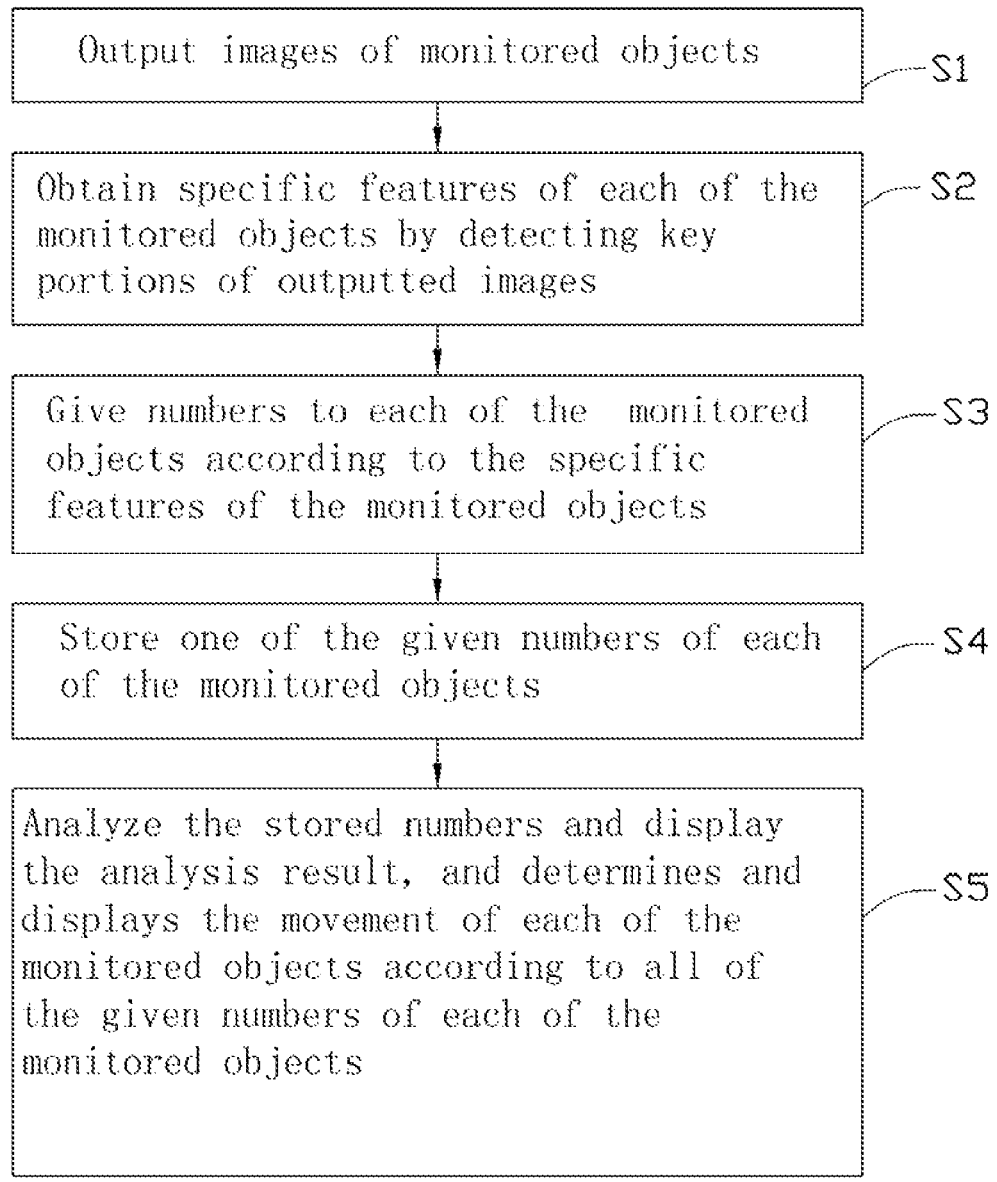
FIG. 5 is a flowchart of an embodiment of a motion object monitoring method.

Referring to FIG. 5, an embodiment of a motion object monitoring method includes the following steps.

In step S1, the video input unit 14 receives the captured images of monitored objects from the camera 12, and transmits the captured images to the information gathering module 32.

In step S2, the information gathering module 32 obtains the specific features of each of the monitored objects by detecting the key portions of the captured images. As mentioned above, the key portions of the captured images are located by the key portion locating unit 322, and detected by the feature obtaining unit 324. The key portions of each of the captured images may include a face or a license plate. The specific features of the monitored objects may be facial features, such as face shapes, and skin colors.

In step S3, the information gathering module 32 gives a number to each of the monitored objects according to the specific features of the monitored objects. Each of the numbers includes the feature portion, the time portion, and the position portion. The feature portions of the numbers of a same pedestrian are the same. The numbers of the monitored objects are generated by the numbering unit 326.

In step S4, the storing and comparing module 34 receives the given numbers, and stores only one of the given numbers of each of the monitored objects. In this embodiment, the storing and comparing module 34 stores a new number when the feature portion of the new number is different from the feature portion of each of the stored numbers. The new number is not stored by the storing and comparing module 34 when the feature portion of the new number is the same to the feature portion of one of the stored numbers.

In step S5, the stored numbers and all of the given numbers are received by the processing module 36 to be analyzed respectively. In this step, the stored numbers are received by the data analyzing unit 362 from the storing and comparing module 34. The stored numbers may be counted by the data analyzing unit 362, and an analysis result of the stored numbers may be displayed by the displaying unit 368. The given numbers are received by the data storing unit 364 from the numbering unit 326. The feature portions, the time portions, and the position portions of the given numbers are helpful to survey the movement of the monitored objects. The displaying unit 368 can display the coordinate positions of each of the pedestrians in sequence of times.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A motion object monitoring system comprising:
    an image generating device outputting a plurality of images of monitored objects appearing in a monitored area in a predetermined time period;
    a processor; and
    a storage device connected to the processor and storing one or more computerized instructions to be executed by the processor, wherein the storage device comprises:
    an information gathering module obtaining specific features of the monitored objects by detecting the outputted images, and giving numbers to each of the monitored objects according to the specific features, wherein each of the given numbers comprises a feature portion representing the specific features of a corresponding one of the monitored objects, and the feature portions of the numbers of the same monitored object are the same;
    a storing and comparing module storing one of the given numbers of each of the monitored objects; and
    a processing module analyzing the given numbers stored in the storing and comparing module.

2. The system of claim 1, wherein the processing module comprises a data analyzing unit analyzing the given numbers stored in the storing and comparing module to obtain an analysis result.

3. The system of claim 2, wherein each of the given numbers further comprises a position portion representing a coordinate position of the monitored object in the monitored area, and a time portion representing a time when the monitored object appears at the coordinate position.

4. The system of claim 3, wherein the processing module comprises:
    a data storing unit receiving the given numbers from the information gathering module, and storing the given numbers;
    an object tracking unit reading the position portions and the time portions of the given numbers with same feature portions, from the data storing unit, and sequencing the position portions according to the time portions correspondingly; and
    a displaying unit displaying the coordinate positions in sequence of time according to the sequenced position portions.

5. The system of claim 1, wherein the storing and comparing module compares the feature portion of a given number with the feature portion of each of the stored numbers in response to receipt of the given number, the storing and comparing module stores the given number in response to the feature portion of the given number being different from the feature portion of all of the stored numbers, the given number is not stored in the storing and comparing module in response to the feature portion of the given number being the same as the feature portion of one of the stored numbers.

6. The system of claim 1, wherein the image generating device comprises:
    an image capturing device capturing the images of monitored objects; and
    a video input unit transmitting the captured images to the information gathering module.

7. The system of claim 1, wherein the information gathering module comprises:
    a key portion locating unit locating key portions which have the specific features of the monitored objects in each of the images;
    a feature obtaining unit obtaining the specific features by detecting the key portions of each of the images; and
    a numbering unit generating the numbers for the monitored objects according to the detected specific features.

8. The system of claim 1, wherein the monitored objects are pedestrians, the key portions of each of the images comprise faces of the pedestrians, the specific features of the monitored objects comprise facial features of the pedestrians.

9. A motion object monitoring method comprising:
transmitting a plurality of images of motion objects in a monitored area to an information gathering module from an image generating device;
obtaining specific features of each of the motion objects by detecting the plurality of images by an information gathering module, wherein the step of obtaining specific features of each of the motion objects comprises:
- locating key portions of each of the plurality of images by a key portion locating unit of the information gathering module; and
- obtaining the specific features by detecting the key portions of each of the plurality of images by a feature obtaining unit of the information gathering module;

giving numbers to each of the motion objects according to the specific features of the motion objects;
storing one of the given numbers of each of the motion objects by a storing and comparing module; and
processing the stored given numbers of the storing and comparing module by a processing module.

10. The method of claim 9, wherein the numbers of each of the motion objects are generated by a numbering unit of the information gathering module.

11. The method of claim 9, wherein each of the given numbers comprises a feature portion representing the specific features of a corresponding one of the motion objects.

12. The method of claim 11, wherein the step of storing one of the given numbers of each of the motion objects comprises:
receiving a number by the storing and comparing module; and
comparing the feature portion of the received number with the feature portion of each of the stored numbers by the storing and comparing module;
wherein the storing and comparing module stores the received number in response to the feature portion of the received number being different from the feature portion of all of the stored numbers; the received number is not stored in the storing and comparing module in response to the feature portion of the received number being the same as the feature portion of one of the stored numbers.

13. The method of claim 9, wherein the step of processing the stored given numbers comprises:
counting the stored given numbers by a data analyzing unit of the processing module; and
displaying a counting result of the stored given numbers by a displaying unit of the processing module.

14. A motion object monitoring method comprising:
transmitting a plurality of images of motion objects in a monitored area to an information gathering module from an image generating device;
giving numbers to each of the motion objects by an information gathering module, wherein each of the numbers of each of the motion objects comprises a feature portion representing specific features of the motion object, a position portion representing a coordinate position of the motion object in the monitored area, and a time portion representing a time when the motion object appears at the coordinate position;
storing and comparing the numbers by a storing and comparing module, wherein the storing and comparing module stores a new number in response to the feature portion of the new number being different from the feature portions of the stored numbers, and does not store the new number in response to the feature portion of the new number being the same as the feature portion of one of the stored numbers;
storing the given numbers in a data storing unit;
reading the position portions and the time portions of the given numbers with same feature portions from the data storing unit, and determining a movement of each of the motion objects by sequencing the position portions according to corresponding time portions by an object tracking unit; and
displaying the movement of each of the motion objects by a displaying unit.

15. The motion objects monitoring method of claim 14, wherein the step of giving numbers to each of the motion objects by an information gathering module comprises:
locating key portions of each of the plurality of images by a key portion locating unit of the information gathering module; and
obtaining the specific features by detecting the key portions of each of the plurality of images by a feature obtaining unit of the information gathering module.

16. The motion objects monitoring method of claim 14, wherein the step of storing the given numbers in a data storing unit comprising:
counting the stored numbers by a data analyzing unit of a processing module; and
displaying a counting result of the stored numbers by a displaying unit of the processing module.

* * * * *